(12) United States Patent
Matsumoto

(10) Patent No.: US 8,863,553 B2
(45) Date of Patent: *Oct. 21, 2014

(54) GLASS WELDING METHOD

(75) Inventor: Satoshi Matsumoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/994,321

(22) PCT Filed: May 11, 2009

(86) PCT No.: PCT/JP2009/058753
§ 371 (c)(1),
(2), (4) Date: Nov. 23, 2010

(87) PCT Pub. No.: WO2009/145044
PCT Pub. Date: Dec. 3, 2009

(65) Prior Publication Data
US 2011/0061789 A1    Mar. 17, 2011

(30) Foreign Application Priority Data

May 26, 2008 (JP) ................. 2008-136841

(51) Int. Cl.
*C03B 23/203* (2006.01)
*C03B 27/02* (2006.01)
*C03C 27/10* (2006.01)
*C03C 23/00* (2006.01)
*C03C 17/04* (2006.01)
*B23K 26/32* (2014.01)

(52) U.S. Cl.
CPC ............. *C03C 27/10* (2013.01); *C03C 23/0025* (2013.01); *C03C 17/04* (2013.01); *B23K 26/324* (2013.01)
USPC .............. 65/36; 65/33.6; 445/24; 445/25

(58) Field of Classification Search
None
See application file for complete search history.

(56) References Cited

U.S. PATENT DOCUMENTS 3,663,793 A    5/1972  Petro et al.
4,343,833 A *  8/1982  Sawae et al. .................... 216/13
(Continued)

FOREIGN PATENT DOCUMENTS

CN    1738777    2/2006
CN    1798708    7/2006
(Continued)

OTHER PUBLICATIONS

Cheung, "Die-Level Glass Frit Vacuum Packaging for a Micro-Fuel Processor System", Massachusetts Institute of Technology, 2005, pp. 17-19.*

(Continued)

*Primary Examiner* — Matthew Daniels
*Assistant Examiner* — Lisa Herring
(74) *Attorney, Agent, or Firm* — Drinker Biddle & Reath LLP

(57) ABSTRACT

A glass layer 3 is disposed between a glass member 4 and a thermal conductor 7 along a region to be fused. The glass layer 3 is formed by removing an organic solvent and a binder from the paste layer while using the thermal conductor 7 as a hotplate. Then, a laser beam L1 is emitted while using the thermal conductor 7 as a heatsink, so as to melt the glass layer 3, thereby burning and fixing the glass layer 3 onto the glass member 4. Thereafter, another glass member is overlaid on the glass member 4 having the glass layer 3 burned thereonto, such that the glass layer 3 is interposed therebetween. Then, the region to be fused is irradiated therealong with a laser beam, so as to fuse the glass members together.

10 Claims, 13 Drawing Sheets

(56) References Cited

U.S. PATENT DOCUMENTS

| | | | |
|---|---|---|---|
| 2005/0103755 A1* | 5/2005 | Baker et al. | 219/121.63 |
| 2006/0082298 A1* | 4/2006 | Becken et al. | 313/512 |
| 2007/0007894 A1 | 1/2007 | Aitken et al. | |
| 2007/0128967 A1* | 6/2007 | Becken et al. | 445/25 |
| 2007/0170845 A1 | 7/2007 | Choi et al. | |
| 2007/0173167 A1 | 7/2007 | Choi | |
| 2009/0297862 A1 | 12/2009 | Boek et al. | |
| 2010/0154476 A1* | 6/2010 | Becken et al. | 65/36 |
| 2011/0061789 A1 | 3/2011 | Matsumoto | |
| 2011/0072855 A1 | 3/2011 | Matsumoto et al. | |
| 2012/0151965 A1 | 6/2012 | Matsumoto et al. | |

FOREIGN PATENT DOCUMENTS

| | | |
|---|---|---|
| CN | 1798710 | 7/2006 |
| JP | 2-120259 | 5/1990 |
| JP | 2002-366050 | 12/2002 |
| JP | 2004-182567 | 7/2004 |
| JP | 2005-007665 | 1/2005 |
| JP | 2005-213125 | 8/2005 |
| JP | 2006-524419 | 10/2006 |
| JP | 2008-115057 | 5/2008 |
| JP | 2008-115067 | 5/2008 |
| JP | 2008-127223 | 6/2008 |
| KR | 10-2007-0003681 | 1/2007 |
| TW | 200516064 | 5/2005 |
| TW | 200733787 | 9/2007 |
| TW | 200822789 | 5/2008 |
| WO | WO 2007/067533 | 6/2007 |

OTHER PUBLICATIONS

U.S. Office Action dated Jun. 28, 2012 that issued in U.S. Appl. No. 12/994,320 including Double Patenting Rejections on pp. 7-9.

U.S. Office Action dated Jun. 6, 2012 that issued in U.S. Appl. No. 13/345,199 including Double Patenting Rejections on pp. 5-8.

U.S. Office Action dated Jan. 22, 2013 that issued in U.S. Appl. No. 13/345,199 including Double Patenting Rejections on pp. 6-8.

JP 20022366050 (Human Translation), retrieved from USPTO Translation Services and attached to the U.S. Office Action dated Apr. 25, 2013 in U.S. Appl. No. 12/994,539.

JP 2008115057 (Human Translation), retrieved from USPTO Translation Services and attached to the U.S. Office Action dated Apr. 25, 2013 in U.S. Appl. No. 12/994,539.

U.S. Office Action dated Apr. 25, 2013 that issued in U.S. Appl. No. 12/994,539 including Double Patenting Rejections on pp. 5-8.

JP 20022366050 (Machine Translation), as attached to Office Action dated Jun. 1, 2012 in U.S. Appl. No. 12/994,354.

JP 2008115057 (Machine Translation), as attached to Office Action dated Jun. 1, 2012 in U.S. Appl. No. 12/994,354.

U.S. Office Action dated May 9, 2013 that issued in U.S. Appl. No. 12/994,399 including Double Patenting Rejections on pp. 6-10.

U.S. Office Action dated Jan. 16, 2014 that issued in U.S. Appl. No. 13/511,735 including Double Patenting Rejections on pp. 4-8.

U.S. Office Action dated Jan. 22, 2014 that issued in U.S. Appl. No. 13/509,112 including Double Patenting Rejections on pp. 4-5.

U.S. Office Action dated Jan. 28, 2014 that issued in U.S. Appl. No. 13/511,688 including Double Patenting Rejections on pp. 4-8.

U.S. Office Action dated Jun. 3, 2014 that issued in U.S. Appl. No. 13/511,683 including Double Patenting Rejections on pp. 5-11.

U.S. Office Action dated Jul. 2, 2014 that issued in U.S. Appl. No. 13/511,754 including Double Patenting Rejections on pp. 5-8.

U.S. Office Action dated Jul. 31, 2014 that issued in U.S. Appl. No. 12/994,354 including Double Patenting Rejections on pp. 7-10.

* cited by examiner (a)

(b)

(a)

(b)

(a)

(b)

(a)

(b)

(a)

(b)

(a)

(b)

(a)

(b)

(a)

(b)

(a)

(b)

GLASS WELDING METHOD

TECHNICAL FIELD

The present invention relates to a glass fusing method for manufacturing a glass fusing structure by fusing glass members together.

BACKGROUND ART

Known as a conventional glass fusing method in the above-mentioned technical field is one comprising burning a glass layer containing a laser-absorbing pigment onto one glass member along a region to be fused, then overlaying the other glass member on the former glass member such that the glass layer is interposed therebetween, and irradiating the region to be fused therealong with a laser beam, so as to fuse one glass member and the other glass member together.

Meanwhile, a typical technique for burning a glass layer onto a glass member is one removing an organic solvent and a binder in a drying furnace and a heating furnace, respectively, from a paste layer containing a glass fit, a laser-absorbing pigment, the organic solvent, and the binder, so as to fix the glass layer firmly to the glass member; and then heating the glass member having the glass layer firmly attached thereto in a firing furnace, so as to melt the glass layer, thereby burning the glass layer onto the glass member (see, for example, Patent Literature 1).

On the other hand, proposed from the viewpoint of suppressing the increase in energy consumption and burning time caused by the use of the firing furnace (i.e., the viewpoint of higher efficiency) is a technique which irradiates a glass layer attached to a glass member with a laser beam, so as to melt the glass layer, thereby burning the glass layer onto the glass member (see, for example, Patent Literature 2).

Citation List

Patent Literature

Patent Literature 1: Japanese Translated International Patent Application Laid-Open No. 2006-524419

Patent Literature 2: Japanese Patent Application Laid-Open No. 2002-366050

SUMMARY OF INVENTION

Technical Problem

However, there have been cases where glass members having glass layers burned thereonto by laser beam irradiation are damaged by cracks and the like occurring at the time of burning and their fusing thereafter. It has also been demanded to further raise the efficiency by leaving the drying furnace and heating furnace unused.

In view of such circumstances, it is an object of the present invention to provide a glass fusing method which can efficiently fuse glass members together by preventing the glass members from being damaged.

Solution to Problem

For achieving the above-mentioned object, the inventors conducted diligent studies and, as a result, have found out that the burning of a glass layer by laser beam irradiation leads to damages in a glass member because of the fact that the laser absorptance of the glass layer drastically increases when the temperature of the glass layer exceeds its melting point $T_m$ at the time of burning as illustrated in FIG. 12. That is, in the glass layer firmly attached to the glass member, voids formed by the removal of the binder and the particle property of the glass fit produce scattering of light exceeding the absorption characteristic of the laser-absorbing pigment, so that the laser absorptance is low (e.g., the glass layer appears whiter under visible light). When a laser beam is emitted with such a laser power P that the glass layer attains a temperature $T_p$ higher than the melting point $T_m$ but lower than its crystallization temperature $T_c$ as illustrated in FIG. 13, the glass frit melts to fill the voids and loses the particle property, so that the laser-absorbing pigment remarkably exhibits its absorption characteristic, whereby the glass layer drastically increases its laser absorptance (e.g., appears darker under visible light). This causes the glass layer to absorb the laser beam more than expected, thereby generating cracks in the glass member because of a heat shock due to excessive heat input. In practice, as illustrated in FIG. 13, the laser irradiation at the laser power P lets the glass layer reach a temperature $T_a$ higher than the crystallization temperature $T_c$. When a portion of the glass layer on the side opposite from the glass member onto which it is to be burned (i.e., a portion of the glass layer located on the side of the glass member to which it is to be fused) is crystallized by excessive heat input, the melting point rises in this portion. This makes it necessary to emit the laser beam with a higher laser power at the time of fusing the glass members together thereafter so as to melt the portion of the glass layer located on the side of the glass member to which it is to be fused, whereby cracks are generated in the glass member because of a heat shock due to excessive heat input as in the burning. The inventors have conducted further studies based on this finding, thereby completing the present invention. The change in color of the glass layer under visible light in the case where the laser absorptance of the glass layer is enhanced by the melting of the glass layer is not limited to the change from a whiter state to a darker state. For example, laser-absorbing pigments for near-infrared laser beams include those exhibiting green when the glass layer melts.

The glass fusing method in accordance with the present invention is a glass fusing method for manufacturing a glass fusing structure by fusing first and second glass members together, the method comprising the steps of forming a paste layer on a thermal conductor along a region to be fused, the paste layer containing a glass powder, a laser-absorbing material, an organic solvent and a binder; removing the organic solvent and the binder from the paste layer by using the thermal conductor as a hotplate, so as to form a glass layer on the thermal conductor; overlaying the first glass member on the thermal conductor formed with the glass layer while interposing the glass layer therebetween, so as to dispose the glass layer between the first glass member and the thermal conductor; irradiating the region to be fused therealong with a first laser beam while using the thermal conductor as a heatsink, so as to melt the glass layer disposed between the first glass member and the thermal conductor, and fix the glass layer to the first glass member; and overlaying the second glass member on the first glass member having the glass layer fixed thereto such that the glass layer is interposed therebetween, and irradiating the region to be fused therealong with a second laser beam, so as to fuse the first and second glass members together.

In this glass fusing method, the glass layer is disposed between the first glass member and the thermal conductor along the region to be fused and then the first laser beam is emitted while using the thermal conductor as a heatsink, so as to melt the glass layer, thereby fixing the glass layer to the first glass member. While the glass layer drastically increases its laser absorptance when being fixed, the thermal conductor serves as the heatsink and draws heat from the glass layer, thereby inhibiting the glass layer from falling into an excessive heat input state. As a consequence, even when the glass layer is fixed to the first glass member by irradiation with the first laser beam, the glass members can be prevented from being damaged by cracks occurring therein and the like at the time of fixing the glass layer and fusing the glass members together thereafter. Also, since the glass layer is formed by removing the organic solvent and binder from the paste layer while using the thermal conductor as a hotplate, the energy consumption can be inhibited from being increased by the use of the drying furnace and heating furnace. Therefore, this glass fusing method can prevent the glass members from being damaged and efficiently fuse the glass members together.

Preferably, in the glass fusing method in accordance with the present invention, the thermal conductor has a thermal conductivity higher than that of the glass powder. This allows the thermal conductor to supply heat efficiently to the glass layer while acting as the hotplate and draw heat efficiently from the glass layer while acting as the heatsink. More preferably, in this case, the thermal conductivity of the thermal conductor is higher than that of the first glass member. This allows the thermal conductor to supply heat more efficiently to the glass layer while acting as the hotplate and draw heat more efficiently from the glass layer while acting as the heatsink.

Preferably, in the glass fusing method in accordance with the present invention, the difference between coefficients of linear expansion of the glass powder and the thermal conductor is greater than the difference between coefficients of linear expansion of the glass powder and the first glass member. This can reliably prevent the glass layer from firmly attaching to the thermal conductor when fixing the glass layer to the first glass member.

Preferably, in the glass fusing method in accordance with the present invention, the first laser beam irradiates the glass layer from the first glass member side. This can fully heat the interface part between the first glass member and the glass layer, thereby strongly fixing the glass layer to the first glass member.

Advantageous Effects of Invention

The present invention can efficiently fuse glass members together by preventing the glass members from being damaged.

DESCRIPTION OF EMBODIMENTS

Figure 1:
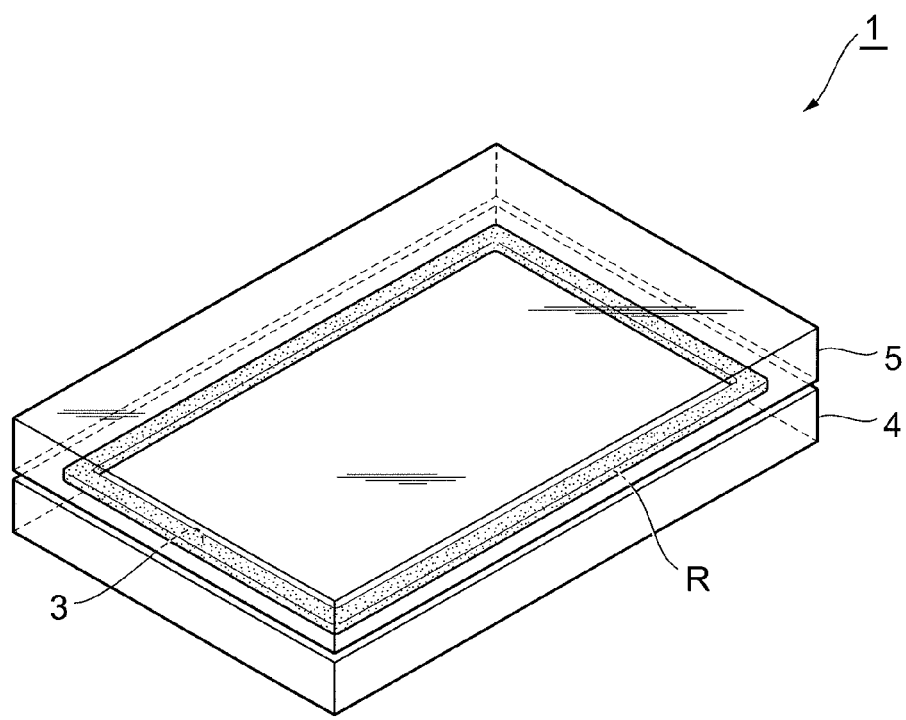
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

FIG. 1 is a perspective view of the glass fusing structure manufactured by an embodiment of the glass fusing method in accordance with the present invention. As illustrated in FIG. 1, the glass fusing structure 1 is a fusion-bonded grass structure in which glass members (first and second glass members) 4, 5 are fused together through a glass layer 3 formed along a region to be fused R. For example, each of the glass members 4, 5 is a rectangular plate-shaped member made of alkali-free glass having a thickness of 0.7 mm, while the region to be fused R is set like a rectangular ring along the outer edges of the glass members 4, 5. For example, the glass layer 3 is made of low-melting glass (vanadium-phosphate-based glass, lead borosilicate glass, or the like) and formed into a rectangular ring along the region to be fused R.

The glass fusing method for manufacturing the above-mentioned glass fusing structure 1 will now be explained. In each of FIGS. 2 to 10, (a) is a plan view, while (b) is an enlarged vertical sectional view of (a). FIG. 11 is a graph illustrating the temperature history of the thermal conductor in the respective cases of FIGS. 2 to 8.

Figure 2:
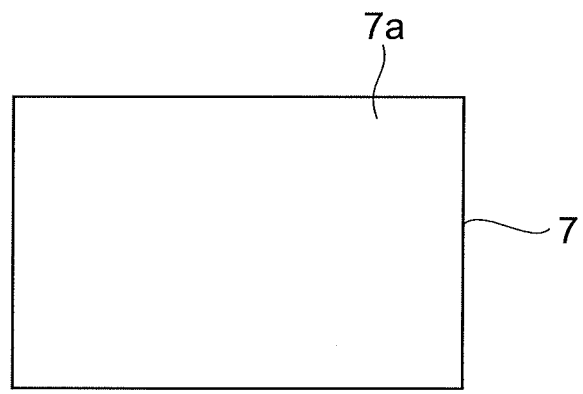
FIG. 2 is a plan and enlarged vertical sectional view for explaining the glass fusing method for manufacturing the glass fusing structure of FIG. 1.
Figure 2:
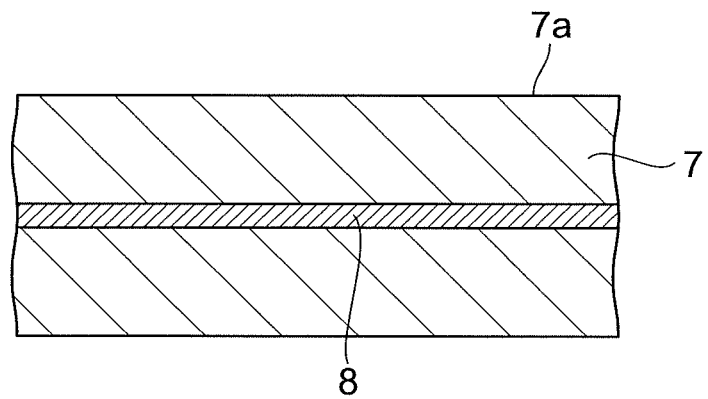
Figure 3:
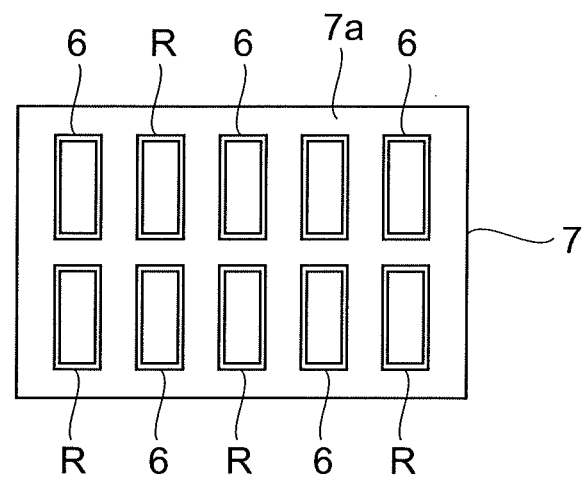
FIG. 3 is a plan and enlarged vertical sectional view for explaining the glass fusing method for manufacturing the glass fusing structure of FIG. 1.
Figure 3:
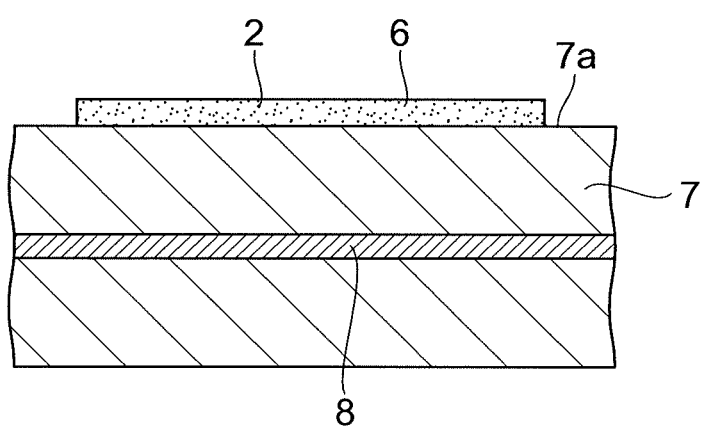

First, as illustrated in FIG. 2, a planar thermal conductor 7 made of aluminum is prepared. A heater 8 constituted by an electric heating wire or the like is buried in the thermal conductor 7. Subsequently, as illustrated in FIG. 3, a frit paste is applied by a dispenser, screen printing, or the like, so as to form a plurality of paste layers 6 into a matrix on a surface 7a (which is a polished surface here) of the thermal conductor 7. An example of the fit paste is one formed by kneading a powdery glass frit (glass powder) 2 made of amorphous low-melting glass (vanadium-phosphate-based glass, lead borosilicate glass, or the like), a laser-absorbing pigment (laser-absorbing material) which is an inorganic pigment such as iron oxide, an organic solvent such as amyl acetate, and a binder which is a resin component (such as acrylic resin) thermally decomposable at the glass softening temperature or lower. Each of the paste layers 6 contains the glass frit, laser-absorbing pigment, organic solvent, and binder and is formed into a rectangular ring so as to correspond to the region to be fused R.

Figure 4:
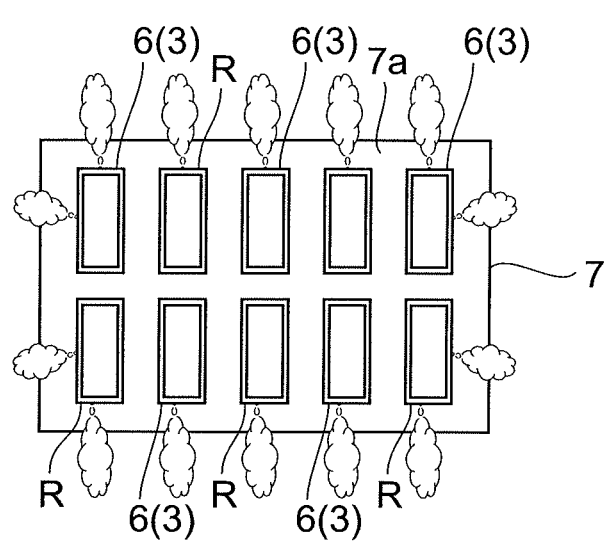
FIG. 4 is a plan and enlarged vertical sectional view for explaining the glass fusing method for manufacturing the glass fusing structure of FIG. 1.
Figure 4:
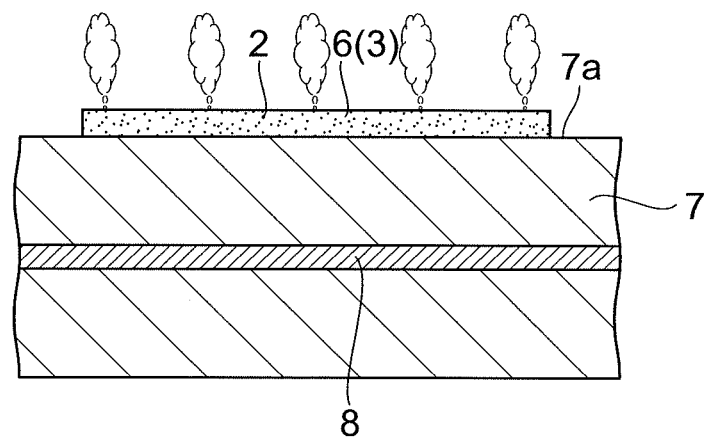

Next, as illustrated in FIG. 4, the heater 8 is actuated, so as to let the thermal conductor 7 work as a hotplate and remove the organic solvent from the paste layers 6, and further raise the temperature of the thermal conductor 7 to a temperature at which the binder decomposes and eliminate the binder, thereby firmly attaching the glass layers 3 to the surface 7a of the thermal conductor 7. Here, voids formed by the removal of the binder and the particle property of the glass fit 2 produce scattering of light exceeding the absorption characteristic of the laser-absorbing pigment, so that each of the glass layers 3 firmly attached to the surface 7a of the thermal conductor 7 is in a low laser absorptance state (e.g., appears whiter under visible light).

Figure 5:
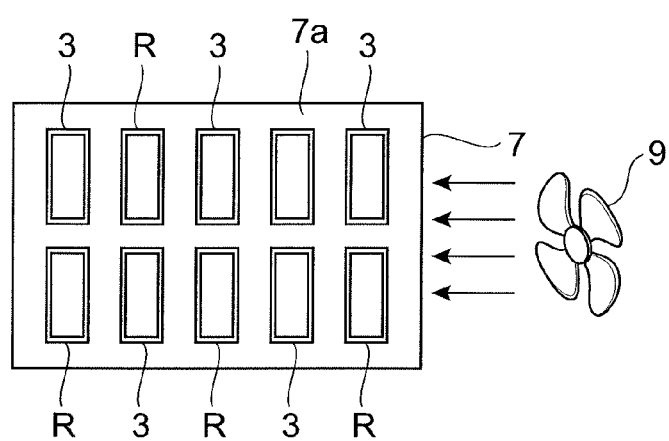
FIG. 5 is a plan and enlarged vertical sectional view for explaining the glass fusing method for manufacturing the glass fusing structure of FIG. 1.
Figure 5:
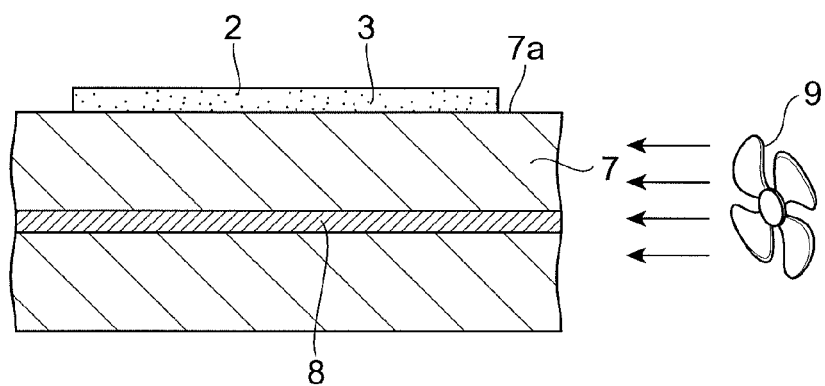
Figure 6:
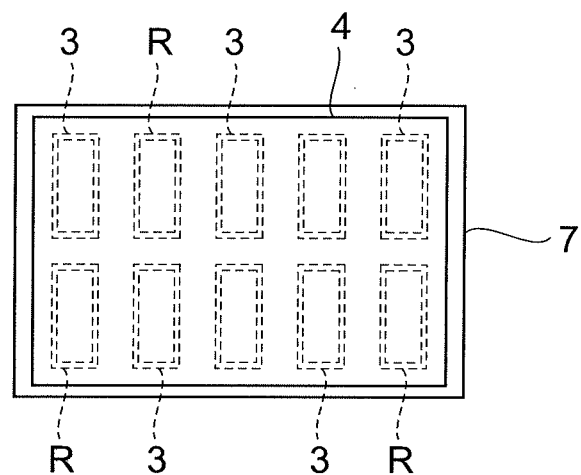
FIG. 6 is a plan and enlarged vertical sectional view for explaining the glass fusing method for manufacturing the glass fusing structure of FIG. 1.
Figure 6:
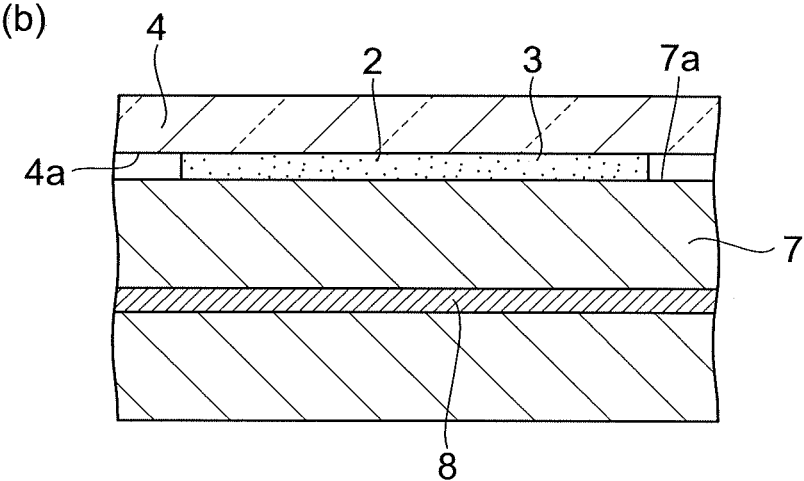

Then, as illustrated in FIG. 5, a fan 9 is actuated while the heater 8 is stopped, so as to cool down the thermal conductor 7 to ambient temperature or thereabout. Subsequently, as illustrated in FIG. 6, the glass member 4 (a substrate including a plurality of glass members 4 arranged in a matrix so as to correspond to the respective glass layers 3 here) is mounted on the surface 7a of the thermal conductor 7 having the glass layers 3 attached thereto, while interposing the glass layers 3 therebetween. As a consequence, the glass member 4 is overlaid on the thermal conductor 7 while interposing the glass layer 3 therebetween, whereby the glass layer 3 is disposed between the glass member 4 and the thermal conductor 7.

Figure 7:
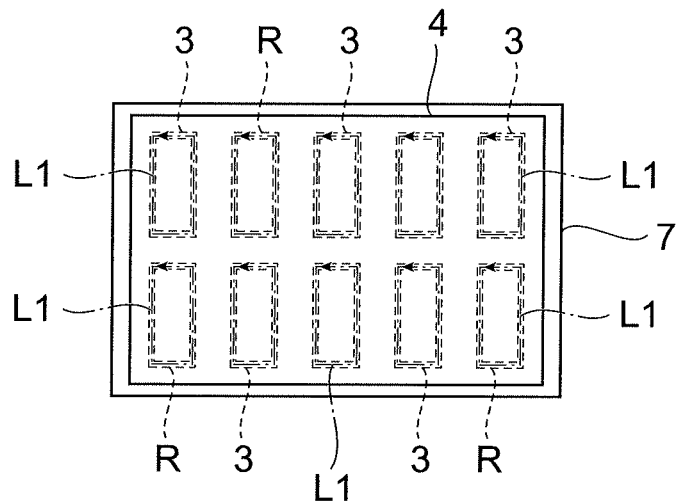
FIG. 7 is a plan and enlarged vertical sectional view for explaining the glass fusing method for manufacturing the glass fusing structure of FIG. 1.
Figure 7:
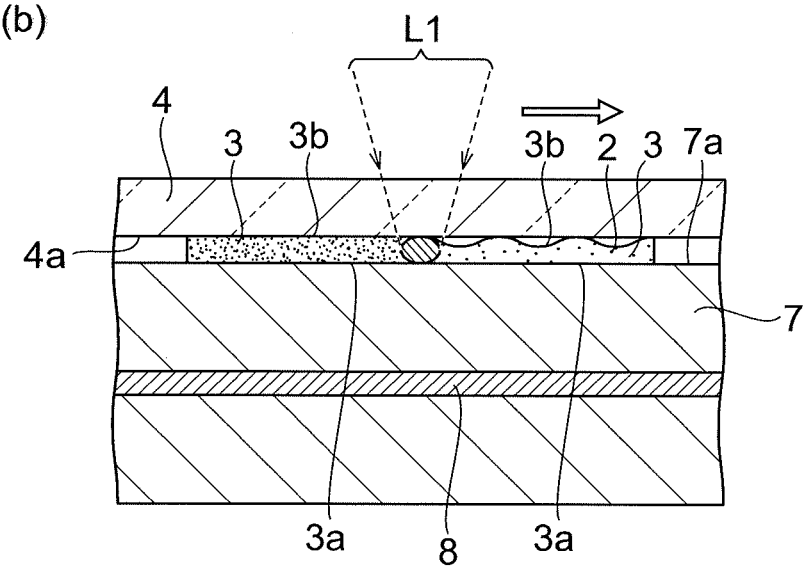

Thereafter, as illustrated in FIG. 7, the regions to be fused R are irradiated therealong with a laser beam (first laser beam) L1 while locating a converging spot at the glass layer 3 and using the thermal conductor 7 as a heatsink. This melts and resolidifies the glass layer 3 disposed between the glass member 4 and the thermal conductor 7, thereby burning the glass layer 3 onto the surface 4a of the glass member 4. As the voids are filled by the melting of the glass frit 2, the glass layer 3 burned onto the surface 4a of the glass member 4 loses its particle property and remarkably exhibits the absorption characteristic of the laser-absorbing pigment, thereby attaining a high laser absorptance state (e.g., appearing darker under visible light). The glass layer 3 burned onto the surface 4a of the glass member 4 flattens not only its surface 3a on the thermal conductor 7 side but also irregularities on its surface 3b on the glass member 4 side.

At the time of burning the glass layer 3, the thermal conductor 7 serves as the heatsink and draws heat from the glass layer 3, thereby inhibiting the glass layer 3 from falling into an excessive heat input state. Here, the thermal conductor 7 is made of aluminum, so that the thermal conductivity of the thermal conductor 7 is higher than that of the glass fit 2 and that of the glass member 4, whereby the heat is dissipated from the glass layer 3 to the thermal conductor 7 very efficiently.

Since the difference between the coefficients of linear expansion of the glass frit 2 and thermal conductor 7 is greater than the difference between the coefficients of linear expansion of the glass frit 2 and glass member 4, the glass layer 3 does not firmly attach to the surface 7a of the thermal conductor 7 at the time of burning. While this fact indicates that it will be more preferred if the difference between the coefficients of linear expansion of the glass frit 2 and thermal conductor 7 is greater, not only aluminum (having a coefficient of linear expansion of $23 \times 10^{-6}$/K) but stainless steel (having a coefficient of linear expansion of $17.3 \times 10^{-6}$/K) or copper (having a coefficient of linear expansion of $16.8 \times 10^{-6}$/K) can also constitute the thermal conductor 7 for use in combination with the glass fit 2 made of vanadium-phosphate-based glass (having a coefficient of linear expansion of $7.0 \times 10^{-6}$/K) or lead borosilicate glass (having a coefficient of linear expansion of $13 \times 10^{-6}$/K).

Figure 8:
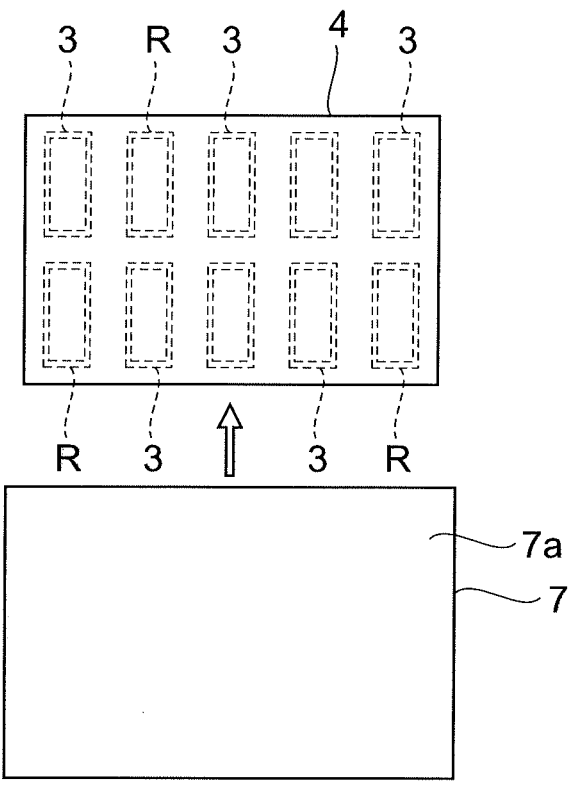
FIG. 8 is a plan and enlarged vertical sectional view for explaining the glass fusing method for manufacturing the glass fusing structure of FIG. 1.
Figure 8:
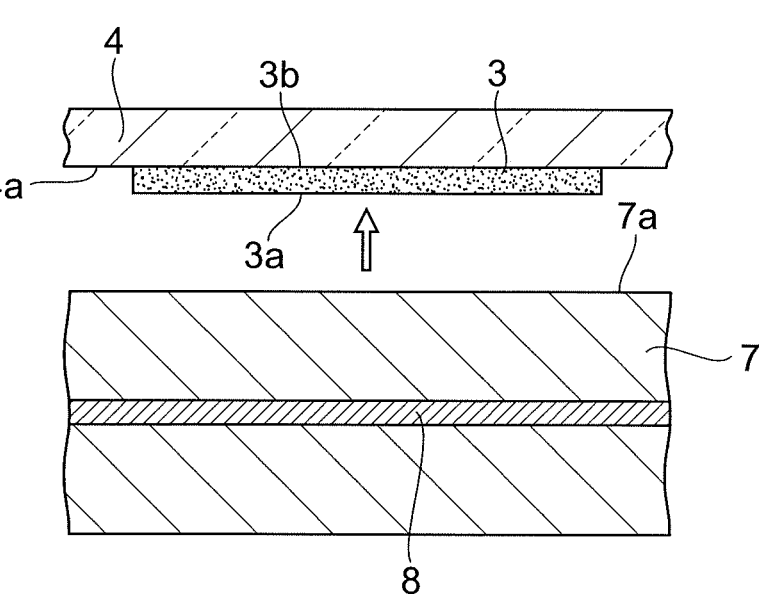
Figure 9:
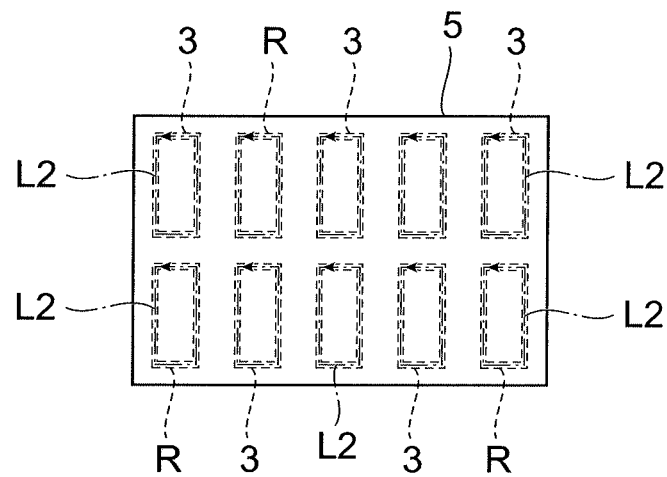
FIG. 9 is a plan and enlarged vertical sectional view for explaining the glass fusing method for manufacturing the glass fusing structure of FIG. 1.
Figure 9:
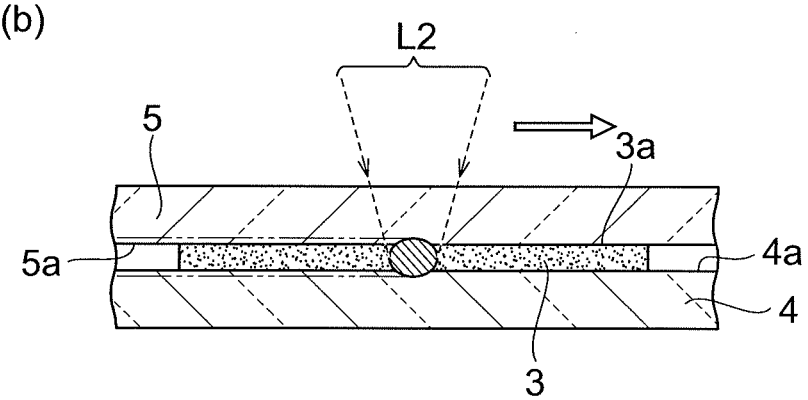

Subsequent to the burning of the glass layer 3, as illustrated in FIG. 8, the glass member 4 having the glass layer 3 burned thereonto is picked up. Then, as illustrated in FIG. 9, the glass member 5 (a substrate including a plurality of glass members 5 arranged in a matrix so as to correspond to the respective glass layers 3 here) is overlaid on the glass member 4 having the glass layer 3 burned thereonto, while interposing the glass layer 3 therebetween. Here, since the surface 3a of the glass layer 3 is made flat, the surface 5a of the glass member 5 comes into contact with the surface 3a of the glass layer 3 without gaps.

In this state, the region to be fused R is irradiated therealong with a laser beam (second laser beam) L2 while locating a converging spot at the glass layer 3. This lets the glass layer 3 in a high laser absorptance state absorb the laser beam L2, so as to melt and resolidify the glass layer 3 and its peripheral portions (the portions of the glass members 4, 5 on their surfaces 4a, 5a), thereby bonding the glass members 4, 5 together. Here, since the surface 5a of the glass member 5 is in contact with the surface 3a of the glass layer 3 without gaps, the glass members 4, 5 are uniformly fused together along the region to be fused R.

Figure 10:
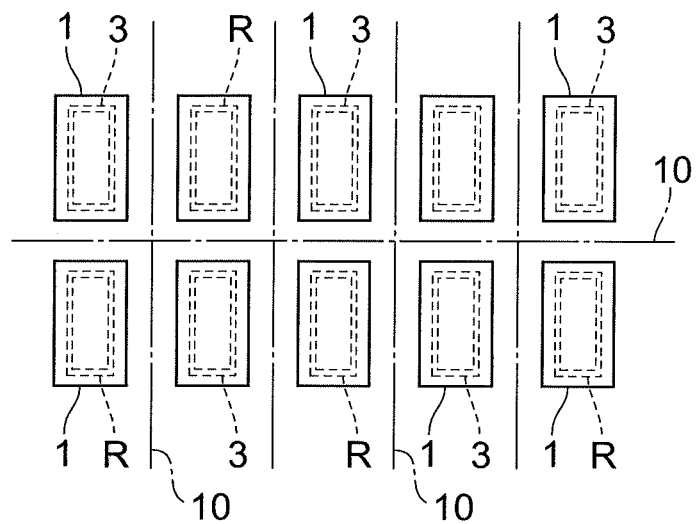
FIG. 10 is a plan and enlarged vertical sectional view for explaining the glass fusing method for manufacturing the glass fusing structure of FIG. 1.
Figure 10:
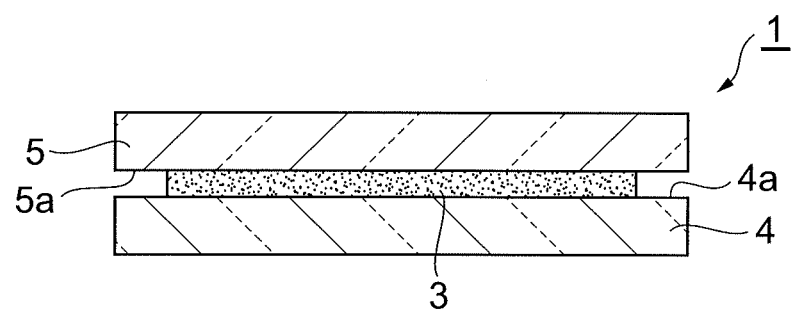
Figure 11:
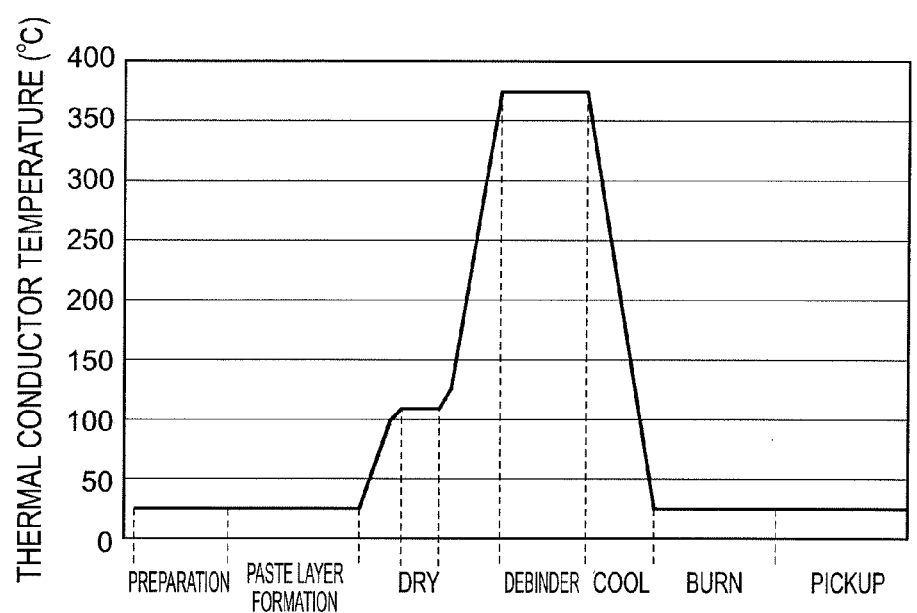
FIG. 11 is a graph illustrating the temperature history of the thermal conductor in the respective cases of FIGS. 2 to 8.
Figure 12:
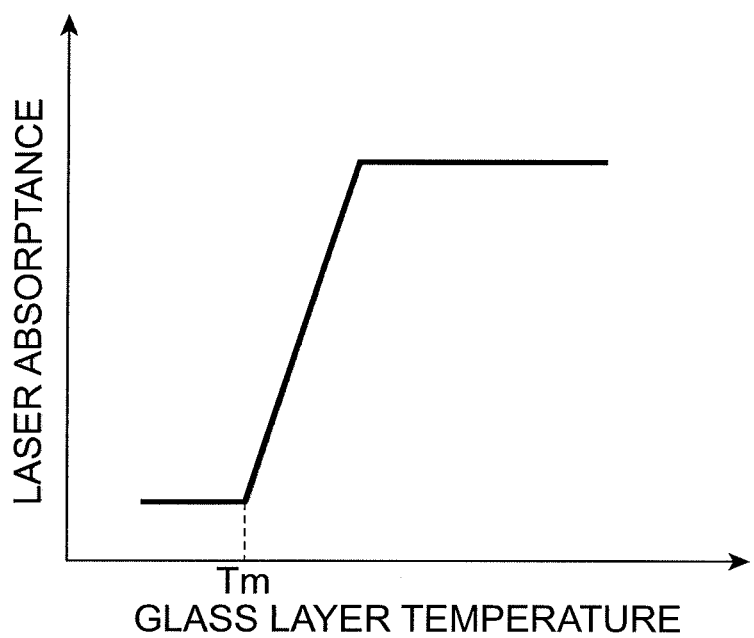
FIG. 12 is a graph illustrating the relationship between the temperature and laser absorptance of a glass layer.
Figure 13:
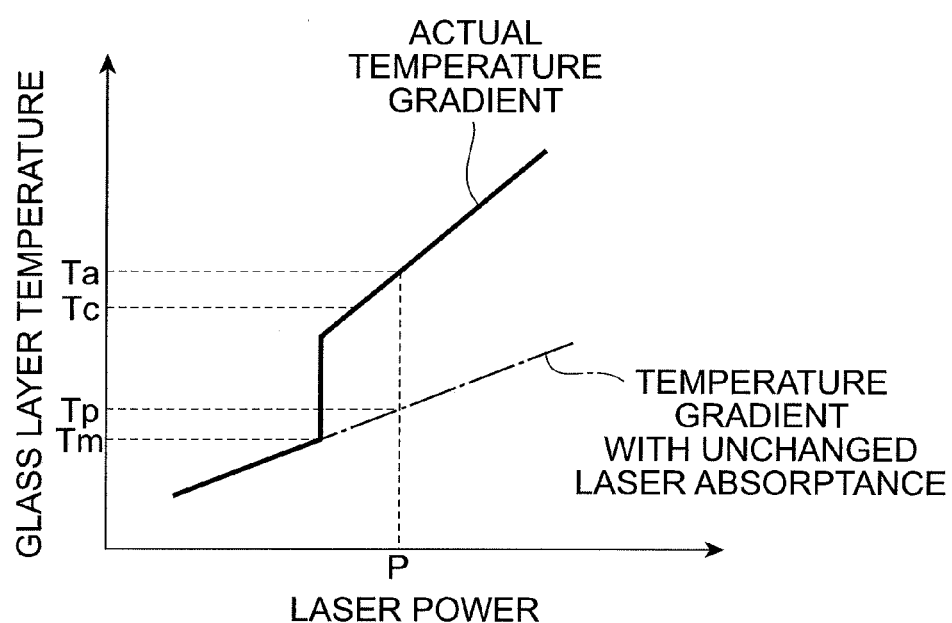
FIG. 13 is a graph illustrating the relationship between the laser power and the temperature of the glass layer.

Next, as illustrated in FIG. 10, the substrate including a plurality of glass members 4, 5 arranged in a matrix so as to correspond to the respective glass layers 3 is cut along planned cutting lines 10, so as to yield a plurality of glass fusing structures 1. Here, the planned cutting lines 10 are set such as to separate the plurality of glass layers 3 arranged in a matrix (i.e., the regions to be fused R) from each other.

As explained in the foregoing, the glass fusing method for manufacturing the glass fusing structure 1 disposes the glass layer 3 between the glass member 4 and the thermal conductor 7 along the region to be fused R, and then emits the laser beam L1 while using the thermal conductor 7 as a heatsink, so as to melt the glass layer 3, thereby burning and fixing the glass layer 3 onto the glass member 4. While the laser absorptance of the glass layer 3 rapidly increases at the time of burning the glass layer 3, the thermal conductor 7 serves as the heatsink and draws heat from the glass layer 3, thereby inhibiting the glass layer 3 from falling into an excessive heat input state. This can prevent cracks from occurring in the glass members 4, 5 because of a heat shock due to excessive heat input at the time of burning the glass layer 3 even when the glass layer 3 is burned by irradiation with the laser beam L1. Further, at the time of burning the glass layer 3, the portion of the glass layer 3 on the surface 3a (i.e., the portion of the glass layer 3 located on the side of the glass member 5 to which it is to be fused) is not crystallized by excessive heat input and thus does not raise its melting point. Therefore, it is not necessary for the laser beam L2 to be emitted with such a high laser power as to melt the portion of the glass layer 3 on the surface 3a at the time of fusing the glass members 4, 5 together thereafter, whereby cracks can be prevented from occurring in the glass members 4, 5 because of a heat shock due to excessive heat input as in the burning of the glass layer 3. Hence, the above-mentioned glass fusing method can efficiently fuse the glass members 4, 5 together by preventing the glass members 4, 5 from being damaged.

The above-mentioned glass fusing method removes the organic solvent and binder from the paste layer 6 by using the thermal conductor 7 as a hotplate, so as to form the glass layer 3. This can inhibit the energy consumption from being increased by the use of the drying furnace and heating furnace and eliminate the limit on sizes of the glass members 4, 5 imposed by the use of the drying furnace and heating furnace.

The above-mentioned glass fusing method irradiates the glass layer 3 with the laser beam L1 from the glass member 4 side. Therefore, the interface part between the glass member 4 and the glass layer 3 is fully heated. Hence, the glass layer 3 can be strongly burned and fixed onto the glass member 4. This can also more reliably prevent the portion of the glass layer 3 (portion of the glass layer 3 on the surface 3a) located on the side of the glass member 5 to which it is to be fused from being crystallized by excessive heat input.

At the time of burning the glass layer 3, the portion of the glass layer 3 located on the side of the glass member 4 onto which it is to be burned may be crystallized by irradiation with the laser beam L1. At the time of fusing the glass members 4, 5 together, the portion of the glass layer 3 (the portion of the glass layer 3 on the surface 3a) located on the side of the glass member 5 to which it is to be fused may be crystallized by irradiation with the laser beam L2. This is because finally crystallizing the glass layer 3 reduces the coefficient of linear expansion of the glass layer 3 in the glass fusing structure 1.

Meanwhile, organic EL packages and the like have a small size themselves, for which thinner glass members 4, 5 are used, so that low expansion glass is often chosen as a material for the glass members 4, 5 in order to make them harder to break. Here, in order for the glass layer 3 to have a coefficient of linear expansion matching that of the glass members 4, 5 (i.e., in order to lower the coefficient of linear expansion of the glass layer 3), the glass layer 3 is made to contain a large amount of a filler constituted by ceramics or the like. By containing the large amount of the filler, the glass layer 3 changes its laser absorptance greatly between before and after irradiation with the laser beam L1. Therefore, the above-mentioned glass fusing method is effective in particular when low expansion glass is chosen as the material for the glass members 4, 5.

The present invention is not limited to the above-mentioned embodiment.

For example, a thermal conductor 7 made of a material transparent to the laser beam L1 may be used, so as to irradiate the glass layer 3 with the laser beam L1 through the thermal conductor 7 from the side opposite from the glass member 4.

Industrial Applicability

The present invention can efficiently fuse glass members together by preventing the glass members from being damaged.

Reference Signs List

1 . . . glass fusing structure; 2 . . . glass frit (glass powder); 3 . . . glass layer; 4 . . . glass member (first glass member); 5 . . . glass member (second glass member); 6 . . . paste layer; 7 . . . thermal conductor; R . . . region to be fused; L1 . . . laser beam (first laser beam); L2 . . . laser beam (second laser beam)

The invention claimed is:

1. A glass fusing method for manufacturing a glass fusing structure by fusing first and second glass members together, the method comprising the steps of:
   forming a paste layer on a thermal conductor along a region to be fused, the paste layer containing a glass powder, a laser-absorbing material, an organic solvent and a binder;
   removing the organic solvent and the binder from the paste layer by using the thermal conductor as a hotplate, so as to form a glass layer on the thermal conductor;
   overlaying the first glass member on the thermal conductor formed with the glass layer while interposing the glass layer therebetween, so as to dispose the glass layer between the first glass member and the thermal conductor;
   irradiating the region to be fused therealong with a first laser beam while using the thermal conductor as a heatsink, so as to melt the glass layer disposed between the first glass member and the thermal conductor, and fix the glass layer to the first glass member, the thermal conductor is situated so that it contacts the glass layer during the irradiation process;
   removing the thermal conductor from the glass layer; and
   overlaying the second glass member on the first glass member having the glass layer fixed thereto such that the glass layer is interposed therebetween, and irradiating the region to be fused therealong with a second laser beam, so as to fuse the first and second glass members together.

2. A glass fusing method according to claim 1, wherein the thermal conductor has a thermal conductivity higher than that of the glass powder.

3. A glass fusing method according to claim 2, wherein the thermal conductor has a thermal conductivity higher than that of the first glass member.

4. A glass fusing method according to claim 1, wherein the difference between coefficients of linear expansion of the glass powder and the thermal conductor is greater than the difference between coefficients of linear expansion of the glass powder and the first glass member.

5. A glass fusing method according to claim 1, wherein the first laser beam irradiates the glass layer from the first glass member side.

6. A glass layer fixing method for fixing a glass layer to a first glass member along a region to be fused in which the first glass member and a second glass member are adapted to be fused together, the method comprising the steps of:
   forming a paste layer on a thermal conductor along the region to be fused, the paste layer containing a glass powder, a laser-absorbing material, an organic solvent and a binder;
   removing the organic solvent and the binder from the paste layer by using the thermal conductor as a hotplate, so as to form the glass layer on the thermal conductor;
   overlaying the first glass member on the thermal conductor formed with the glass layer while interposing the glass layer therebetween, so as to dispose the glass layer between the first glass member and the thermal conductor;
   irradiating the region to be fused therealong with a laser beam while using the thermal conductor as a heatsink, so as to melt the glass layer disposed between the first glass member and the thermal conductor, and fix the glass layer to the first glass member, the thermal conductor is situated so that it contacts the glass layer during the irradiation process; and
   removing the thermal conductor from the glass layer.

7. A glass layer fixing method according to claim 6, wherein the thermal conductor has a thermal conductivity higher than that of the glass powder.

8. A glass layer fixing method according to claim 7, wherein the thermal conductor has a thermal conductivity higher than that of the first glass member.

9. A glass layer fixing method according to claim 6, wherein the difference between coefficients of linear expansion of the glass powder and the thermal conductor is greater than the difference between coefficients of linear expansion of the glass powder and the first glass member.

10. A glass layer fixing method according to claim 6, wherein the laser beam irradiates the glass layer from the first glass member side.

* * * * *